United States Patent

[11] 3,629,489

| [72] | Inventors | Ludwik Jachimowicz<br>Elizabeth;<br>Joseph B. Masterson, Carteret, both of N.J. |
|---|---|---|
| [21] | Appl. No. | 728,501 |
| [22] | Filed | May 13, 1968 |
| [45] | Patented | Dec. 21, 1971 |
| [73] | Assignee | General Cable Corporation<br>New York, N.Y. |

[54] CABLE SHEATHING
12 Claims, 2 Drawing Figs.

[52] U.S. Cl. .................................................. 174/107,
174/36, 174/105 R
[51] Int. Cl. ...................................................... H01b 7/18
[50] Field of Search ............................................ 174/36,
102–100, 120, 68 C; 156/54, 78, 79; 138/128, 139,
143, 141, 151

[56] References Cited
UNITED STATES PATENTS
3,332,138  7/1967  Garner .................... 29/430
2,589,700  7/1949  Johnstone .................... 174/106
3,360,409  12/1967  Jachimowicz et al. ........ 156/54
3,206,541  9/1965  Jachimowicz ................ 174/105
3,233,036  2/1966  Jachimowicz ................ 174/103

Primary Examiner—Lewis H. Myers
Assistant Examiner—A. T. Grimley
Attorney—Andow, Neill, Schottler & Wikstrom ABSTRACT: This improvement in Stalpeth (steel/aluminum/polyethylene) cable sheath has the aluminum strip coated with a waterproof coating so that in the event of puncture of the soldered steel envelope, the water that gets between the steel and the aluminum cannot interrupt the continuity of the metallic shield by corrosion of the dissimilar metals in contact with the water. In the preferred construction, the coating on the aluminum is fused to the steel around part of the circumference, and aluminum touches the steel along a protected longitudinally extending area to provide electrical continuity, and this is most conveniently located under the soldered seam of the steel jacket.

PATENTED DEC 21 1971

3,629,489

INVENTORS
LUDWIK JACHIMOWICZ
JOSEPH B. MASTERSON
BY
ATTORNEYS.

CABLE SHEATHING

BACKGROUND AND SUMMARY OF THE INVENTION

A certain type of cable sheath called Stalpeth is well established and consists of a polyethylene jacket inside of which there is an overlapped and soldered steel envelope or jacket and a nonoverlapping, narrower aluminum strip surrounding a cable core.

The main use of the Stalpeth sheath is over a cable core consisting of paper or pulp insulated conductors bunched together and wrapped with paper tapes helically applied. A certain percentage of cables have, for better protection of the cable core, and underneath the Stalpeth sheathing, an additional polyethylene jacket or inner jacket impervious to moisture as described in U.S. Pat. No. 3,206,541. This additional inner jacket is placed underneath the Stalpeth sheathing for the purpose of protection of the cable core against moisture ingress, in cases where the outer plastic jacket is punctured by mechanical damage or by lightening currents.

In the Stalpeth sheathing of present design, once the outer polyethylene jacket is punctured and water is allowed to get into contact with the steel envelope, it is only a matter of time before the steel corrodes and admits water under the envelope. From that moment on, electrical corrosion begins between the dissimilar metals of the steel envelope and the aluminum strip. Eventually the continuity of the metallic shield is interrupted by this corrosion. It is desirable, however, to extend the life span of the cable even after water entry under the outer jacket by protecting at least the main current carrying component of the metallic sheathing against this forced corrosion. The present invention accomplishes this object and greatly extends the life span of the cable.

The sheath of the present invention includes an outer jacket of polyolefin and a soldered steel envelope, preferably a corrugated steel strip wrapped longitudinally In the Stalpeth sheathing of present design, once the outer polyethylene jacket is punctured and water is allowed to get into contact with the steel envelope, it is only a matter of time before the steel corrodes and admits water under the envelope. From that moment on, electrical corrosion begins between the dissimilar metals of the steel envelope and the aluminum strip. Eventually the continuity of the metallic shield is interrupted by this corrosion. It is desirable, however, to extend the life span of the cable even after water entry under the outer jacket by protecting at least the main current carrying component of the metallic sheathing against this forced corrosion. The present invention accomplishes this object and greatly extends the life span of the cable.

The sheath of the present invention includes an outer jacket of polyolefin and a soldered steel envelope, preferably a corrugated steel strip wrapped longitudinally with an overlapped seam and with the seam soldered. This envelope is under the jacket, and within the envelope there is an aluminum strip folded longitudinally around the core and coated on both sides with a waterproof coating, preferably an adhesive copolymer.

In the preferred construction of the invention, the aluminum strip is substantially of the same width as the steel strip and is sealed at the overlap by fusion of adhesion layers that coat the strip.

When the outer jacket is punctured and water is admitted under the jacket, the steel strip is exposed to water and corrosion. However, the aluminum strip is insulated from the steel by the layer of adhesive plastic which protects the aluminum from contact with the water thus preventing electrolytic corrosion. It was found by experiment that when such composite sheathing was immersed in water with a free access of air, the steel envelope corroded completely while the aluminum strip remained intact, as new and shiny when first applied to the cable. In this way electrical continuity of the metallic sheathing was retained even after the steel was corroded away. This phenomenon substantially extends the life span of the cable.

Additional benefits are realized in the construction of this invention Since the aluminum strip is sealed at the overlap, the mechanical strength of the sheathing is increased compared with the construction of the present Stalpeth cable. It is known that in bending of Stalpeth cables to the equivalent of eight re-reelings, the aluminum strip cracks at corrugations followed by circumferential cracks in the steel strip. In the design of the present invention with the aluminum strip sealed at the overlap, the aluminum strip is also preferably fused to the steel strip at least in the vicinity of the soldered seam of the steel strip. A rigid lamination of the steel and aluminum strips is obtained on at least a part of the cable circumference. This increases the strength of both layers, and corrugations are prevented from collapsing at cable bending. It has been established experimentally that the new sheath design of this invention has superior endurance to cable bending. Endurance has been increased threefold from eight re-reelings to the equivalent to 24 re-reelings before either of the metalic strips shows the first crack, In other words, endurance of the sheath to flexing has been increased beyond the endurance to flexing of the cable core itself.

The above-described mechanical features makes the sheathing of this invention suitable for cables which have no inner jacket, that is, for those in which water entry under the inner jacket will soak cable conductors and make the cable unsuitable before the steel envelope is corroded away. For those cables, increased mechanical sturdiness of the sheathing is sufficient to justify economically the application of the improved sheathing of this invention. Moreover, in case of damage to the jacket only, the sealed aluminum envelope will serve as a water impervious metallic envelope as long as the coating on the aluminum strip remains undamaged.

In the construction of the present invention, the electrical contact between the aluminum strip and the steel strip is preferably maintained throughout the length of the cable along one edge of the aluminum strip. It is a feature of the preferred embodiment of the invention to position the seam of the aluminum strip adjacent to the seam of the soldered steel envelope. This arrangement causes the heating of the soldering to soften the plastic coating on the aluminum strip at its edge adjacent to the steel strip; and the steel strip is pressed against the aluminum strip with sufficient force during soldering to brush away or displace the softened plastic at the edge of the aluminum strip and to effect a metallic pressure contact between the steel and aluminum along the entire length of the cable. This heat is preferably sufficient to fuse the coating on the aluminum to the steel where the pressure is not sufficient to displace the plastic coating.

This allows for execution of grounding or retention of electrical continuity of the composite metal sheathing by applying soldering to the steel envelope only as is done in conventional Stalpeth sheathing. It can be used with the present invention regardless of whether the aluminum has the feature of an overlapped seam or whether the aluminum is narrower than the steel strip and has no overlap but merely the feature of waterproof coating on both sides. An interruption of the steel envelope by corrosion some distance away from a splicing point has no effect on the electrical continuity of the sheath because of this connection of the steel with the aluminum strip. If corrosion is feared at splice points, then the cable should have an inner jacket over the cable core made continuous over the splice point and should have straps of known design applied to the aluminum component of the sheath between cable ends in addition to conventional soldering of a lead sleeve to the steel envelope of the cable end.

If the invention is made with the aluminum strip narrower than the steel strip so that there is no overlapped seam for the aluminum strip, this reduces the mechanical strength of the sheathing and deprives the cable of the benefit of the sealed aluminum envelope but does not effect the feature of this invention by which retention of electrical continuity of the metallic envelope is maintained after the steel component of the composite sheath is corroded away.

Other objects, features and advantages of the invention will appear or be pointed out as the description proceeds.

DESCRIPTION OF THE PREFERRED EMBODIMENT

Figure 1:
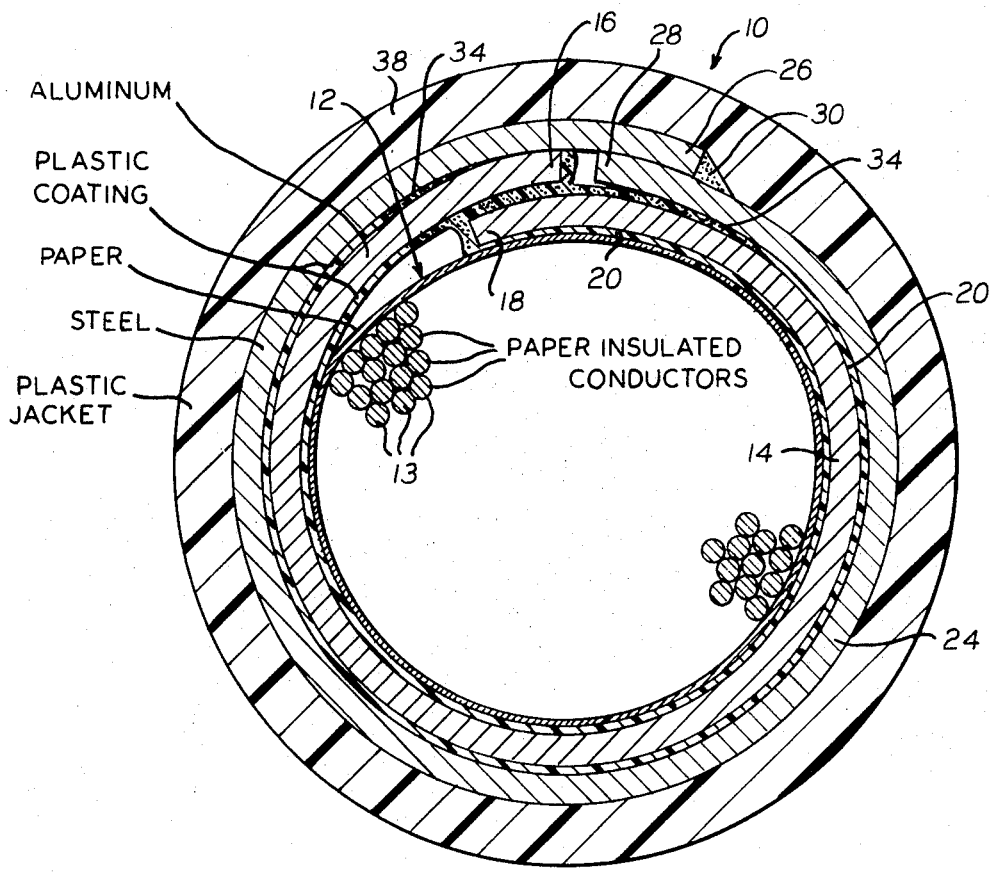
FIG. 1 is a sectional view through a cable made in accordance with this invention.

FIG. 1 shows a cable 10 having a core 12 made up of a plurality of individually insulated conductors 13 which are usually insulated with paper or pulp insulation in cables of the type for which this invention is primarily intended. The cable core 12 is surrounded by an aluminum strip 14 folded longitudinally around the core 12.

In the construction shown in FIG. 1, the width of the aluminum strip 14 is greater than the circumference of the core 12 so that the aluminum strip 14 has an outer edge portion 16 which overlaps an inner edge portion 18 to give the aluminum strip a longitudinally extending lap seam so that the aluminum strip forms an envelope around the core 12.

There is a waterproof coating 20 on both sides of the aluminum strip 14. This waterproof coating is an adhesive layer preferably made of plastic such as a polyolefin consisting of a copolymer of ethylene and other monomer containing carboxyl groups. The coating or adhesive layer 20 is preferably from 1.5 to 3 mils in thickness. Other material can be used for the coating 20 as long as it one that will adhere to the aluminum without delamination in the presence of moisture and by virtue of the chemical composition of the layer, that is, without the use of intermediate adhesive between the aluminum strip and the protective coating. In more detail the preferable sort of coating for the aluminum strip has been described in the Jachimowicz U.S. Pat. No. 3,233,036.

Outside of the aluminum strip 14 there is a steel envelope consisting of a steel strip 24 which has overlapping edge portions including an outer edge portion 26 which overlaps an inner edge portion 28. This lap seam, which extends lengthwise of the cable, is closed by soldering 30. It will be understood that other connections for securing edges together, such as welding and brazing are to be considered mechanical equivalents of the solder 33. Both the aluminum strip 14 and the steel strip 24 are preferably corrugated and made of material having a thickness between 5 and 10 mils.

In the region of the lap seam of the steel envelope where heat is used to bond the solder 30 to the edge portions of the steel strip to seal the overlapping edges 26 and 28, the heat fuses the coating on the aluminum strip 14 so that the edge portion 16 and 18 of the aluminum strip are secured to one another by the coating 20 on their confronting faces. Where the edge portion 16 of the aluminum strip is thrust against the steel envelope by the resilience of the metal, the softening of the coating 20 on the aluminum strip causes the coating to be displaced so that the bare metal of the edge portion 16 of the aluminum which confronts the inside surface of steel strip 24 makes a metal-to-metal contact which serves as a conductor of electricity so that the steel and aluminum strips are in electric contact with one another for a short distance back from the edge of the aluminum edge portion 16. A little further back on the edge portion 16, the plastic coating 20 is fused to form an adhesive connection between the steel strip 24 and the confronting area of the aluminum strip 14 where this fusion of the coating 20 takes place. Similarly there is a melting of the coating 20 under the edge portions 28 of the steel strip 24 so that the coating 20 under this edge portion 28 forms an adhesive bond between the steel and the aluminum strip for another portion of the circumferential extend to the strips. The angle through which these adhesively bonded areas between the steel and the aluminum, which areas are indicated by stippling the section and by the reference characters 34 in FIG. 1 depends upon the amount of heat used in making the soldered seam 30 and upon the softening point of the particular coating 20 that is used on the aluminum strip 14.

FIG. 1 shows the coatings 20 extending over the edges of the aluminum strip 14. This provides complete protection for the aluminum, though it is not essential that these edges be covered since any corrosion which takes place edgewise between the broad coated inner and outer surface of the aluminum strip is very slow. Corrosion which would extend through the full thickness of the aluminum strip, makes very little difference where it merely extends inward from a raw edge. In the construction shown in FIG. 1, it should be understood that the aluminum strip and the steel strip are both corrugated with corrugations extending transversely of the length of the cable, but for clearer illustration, the strips are shown as solid material in the section lining. In actual practice the thickness of the strips 14 and 24 is preferably between 5 and 10 mils.

An outer jacket 38 surrounds the steel envelope 24. This outer jacket is plastic and is usually made of polyethylene extruded over the steel envelope 24.

Figure 2:
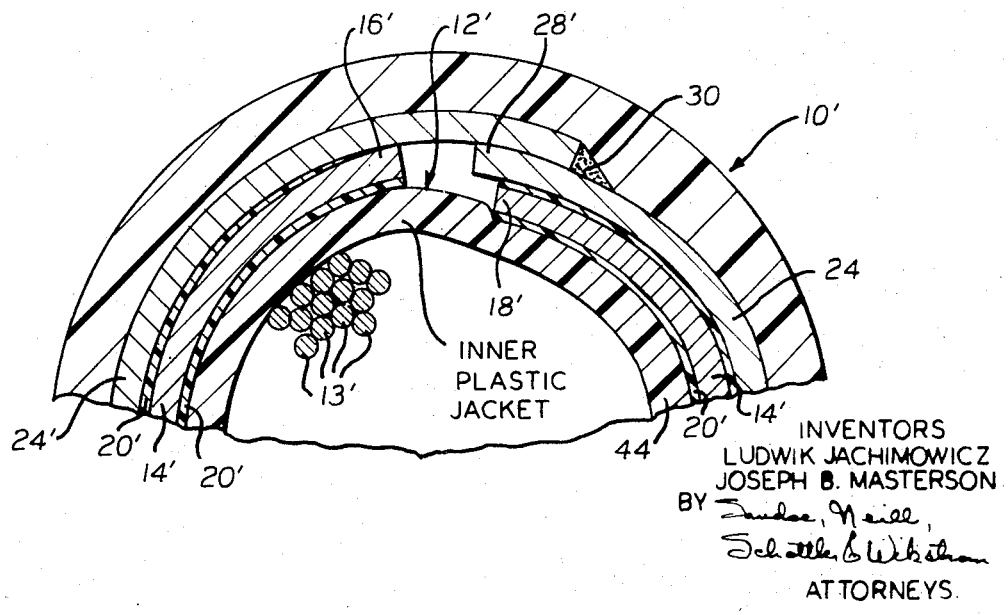
FIG. 2 is a fragmentary, sectional view similar to FIG. 1 but showing a modified form of the invention with the aluminum strip narrower than the steel strip.

FIG. 2 shows a modified construction which differs from the construction shown in FIG. 1 in two respects. Corresponding parts in FIG. 2 are indicated by the same reference characters as in FIG. 1 but with a prime appended. The differences in construction are that the core 12' of FIG. 2 has an inner plastic jacket 44 which protects the conductors 14 from moisture even though the metal strips 14 and 24, and the outer jacket 38 are damaged so that water can enter the cable as far as the inner jacket 44.

The other difference in FIG. 2, as compared with the construction shown in FIG. 1, is that an aluminum strip 14' in FIG. 2 is narrower than the steel strip 24'. In the illustrated construction, the strip 14' is so much narrower that the edges of the strip 14 do not overlap and do not come into contact with one another. Thus there is an open seam along the length of the aluminum strip 14'.

The steel strip 24' has a solder seam 30' constructed the same way as in FIG. 1. The aluminum strip 44' is coated with the same waterproof coating 20' as already described in connection with FIG. 1. While this coating 20' does not seal the edges of the aluminum strip 14' together, because they do not contact with one another, it does connect the edge portions of the aluminum strip 14' to the confronting inner faces of the steel strip 24' at the region 34' where the coating 20, softened by the heat of the soldering operation, causes the metal strips to be bonded together by the adhesive action of the softened coating 20. Also the edge portion 16' of the aluminum strip 14' presses against the steel strip to establish a metal-to-metal contact in the same way as previously described for the cable shown in FIG. 1. Also the edge 18' of the aluminum strip, since it contacts directly with the steel and is subject to pressure of the steel against it, will displace the fused coating 20 to establish a metal-to-metal contact with the steel along the inner edge 20' of the steel envelope.

The preferred embodiments of the invention have been illustrated and described, but changes and modifications can be made and some features can be used in different combinations without departing from the invention as defined in the claims.

What is claimed is:

1. In an electrical cable including a core having a plurality of conductors, an inner metallic strip, of good electrical conductivity, longitudinally wrapped around the core, a transversely corrugated outer strip, of different kind of metal and of poorer electrical conductivity than the inner strip, longitudinally wrapped around the inner metallic strip with the longitudinal edges of the outer strip overlapped and metallically bonded together, and a protective plastic jacket covering the outer strip, the improvement which comprises a protective coating on both sides of the inner strip, from one edge region which is substantially bare of coating for establishing electrical conductivity from the outer to the inner strip, around the circumference of said inner strip continuously to the opposite edge portion thereof, said coating being of electrical insulating material bonded to the surfaces of the inner strip to prevent electrolysis of the different metals in the event of puncture of the jacket and the outer strip and resulting entry of water into the cable under the outer strip, the inner and outer strips being fusion-bonded together by the coating on the outside of the inner strip so that connection of the inner and outer strips is obtained on at least part of the cable circumference for preventing collapse of the corrugations, at cable ending, and resulting increase in re-reeling toleration of the cable.

2. The electrical cable described in claim 1 characterized by the inner strip being aluminum, the outer strip being steel, and the electrical insulation of the inner strip being a thin layer of plastic.

3. The electrical cable described in claim 2 characterized by the longitudinally wrapped strips forming tubes, both of which are corrugated with corrugations fitting into one another, the edge portions of the aluminum strip extending in opposite directions toward their respective edges and overlapping one another in a lap seam extending lengthwise of the cable, the lap seam being sealed closed by fused together material of the plastic coating on the confronting faces of the aluminum strip where the edge portions overlap, the sealed seam of the aluminum tube cooperating with the fused connection between the tubes to prevent collapsing of the corrugations and to increase tolerance of the cable for re-reeling.

4. The electrical cable described in claim 3 characterized by the aluminum strip being of substantially the same width as the steel strip, and the upper edge portion of the lap seam of the aluminum strip pressing upward against the inside of the surrounding steel strip with sufficient force to displace the insulating coating on the aluminum strip and establish the substantially bare edge region that provides an electric circuit between the aluminum and the steel around at least a portion of the circumference of the cable.

5. The electrical cable described in claim 3 characterized by the longitudinal seams of the aluminum strip and the steel strip being in adjacent positions around the circumference of the cable whereby fusing the seam of the outer steel strip also fuses the coating on the confronting edge faces of the aluminum strip, the steel strip having a fusion bond to the coating on the outside of the aluminum strip along the length of the cable and around at least a portion of the angular extend of the cable where the seams of the aluminum and the steel strips are adjacent to one another.

6. The electrical cable described in claim 1 characterized by the electrical insulating coating of the inner strip having a thickness on each surface of sad inner strip between about 1.5 and 3 mils.

7. The electrical cable described in claim 2 characterized by the aluminum strip having a thickness of metal between about 5 and 10 mils, and the steel strip also having a thickness of metal between about 5 and 10 mils.

8. The electrical cable described in claim 7 characterized by the plastic coating on the aluminum being between about 1.5 and 3 mils in thickness.

9. The electrical cable described in claim 1 characterized by the electrical insulating material on the inner strip being an adhesive layer of polyolefin comprising a copolymer of ethylene and other monomer containing carboxyl groups.

10. The electrical cable described in claim 3 characterized by the electrical insulating material on the inner strip being a plastic layer bonded to the aluminum but terminating before reaching the edge of the aluminum strip that forms the outer lap of the seam of the aluminum strip to provide the substantially bare surface in contact with an inside surface of the steel strip along the length of the cable to maintain electrical continuity of the aluminum and steel in the direction of the length of the cable.

11. The electrical cable described in claim 3 characterized by the outer edge portion of the inner strip being under the outer edge portion of the overlapping outer strip, solder along said outer edge of the overlapping outer strip, the substantially bare edge region of the inner strip being under the region of the solder and having surface contact with an inside surface of the outer strip along the length of the cable to maintain electrical continuity of the inner and outer strips whereby the inner strip provides a conductor in parallel with the outer strip throughout the length of the cable.

12. The electrical cable described in claim 11 characterized by the inner strip having edge portions extending in opposite directions toward their respective edges and overlapping one another in a lap seam extending lengthwise of the cable, said lap seam of the inner strip being sealed along its full length by coating fused on the confronting edge portion of the lap seam, the edge portion of the inner strip that has the substantially bare region in contact with the outer strip being the outer edge portion of the lap seam where the inner strip is of double thickness because of the lap.

* * * * *

UNITED STATES PATENT OFFICE
CERTIFICATE OF CORRECTION

Patent No. 3,629,489         Dated December 21, 1971

Inventor(s) Ludwik Jachimowicz et al.

It is certified that error appears in the above-identified patent and that said Letters Patent are hereby corrected as shown below:

Column 1, cancel lines 34 through 50. Column 2, line 16, "metalic" should read -- metallic -- . Column 3, line 28, "as it one" should read -- as it is one -- ; line 68, "extend" should read -- extent -- . Column 5, line 6, "cable ending" should read -- cable bending -- ; line 41, "extend" should read -- extent -- .

Signed and sealed this 14th day of November 1972.

(SEAL)
Attest:

EDWARD M. FLETCHER, JR.
Attesting Officer

ROBERT GOTTSCHALK
Commissioner of Patents